US011524620B2

(12) United States Patent
Hughes et al.

(10) Patent No.: US 11,524,620 B2
(45) Date of Patent: Dec. 13, 2022

(54) TIE DOWN STRAP ASSEMBLY INCLUDING A PLURALITY OF ANCHOR POINTS

(71) Applicants: Armanda Hughes, Hempstead, NY (US); Cameron Hughes, New York, NY (US)

(72) Inventors: Armanda Hughes, Hempstead, NY (US); Cameron Hughes, New York, NY (US)

( * ) Notice: Subject to any disclaimer, the term of this patent is extended or adjusted under 35 U.S.C. 154(b) by 215 days.

(21) Appl. No.: 17/146,014

(22) Filed: Jan. 11, 2021

(65) Prior Publication Data

US 2022/0219595 A1 Jul. 14, 2022

(51) Int. Cl.
*B60P 7/08* (2006.01)

(52) U.S. Cl.
CPC ................... *B60P 7/0823* (2013.01)

(58) Field of Classification Search
CPC ............... B60P 7/0823; F16B 45/00
USPC ........... 410/96, 97, 10, 11, 23, 34, 100, 116; 24/586.1, 588.1
See application file for complete search history.

(56) References Cited

U.S. PATENT DOCUMENTS

| | | | |
|---|---|---|---|
| 2,447,422 A | 8/1948 | Nelson | |
| 5,224,247 A | 7/1993 | Collier | |
| 5,673,464 A | 10/1997 | Whittaker | |
| 6,851,902 B2 | 2/2005 | Stanley | |
| 7,228,600 B1 * | 6/2007 | Selby | F16B 45/02 24/601.5 |
| 7,603,754 B2 * | 10/2009 | Hayes | F16B 45/00 24/DIG. 42 |
| 9,199,571 B2 * | 12/2015 | Leung | B60P 7/0823 |
| 9,249,825 B1 | 2/2016 | Cornay | |
| 9,528,655 B1 * | 12/2016 | Miles | F16M 13/022 |
| 9,694,877 B2 | 7/2017 | Miles | |
| 10,738,820 B1 | 8/2020 | Cornay | |

(Continued)

OTHER PUBLICATIONS

International Search Report issued by the U.S Commissioner of Patents acting as the International Searching Authority in relation to International Application No. PCT/US1/65261 dated Mar. 16, 2022 (2 pages).

(Continued)

*Primary Examiner* — D Glenn Dayoan
*Assistant Examiner* — Sunsurraye Westbrook
(74) *Attorney, Agent, or Firm* — Robert P. Michal, Esq.; Carter, DeLuca & Farrell LLP (57) ABSTRACT

A tie down strap assembly includes a strap and first and second hook assemblies disposed at respective opposing ends of the strap. The strap is formed of an elastic material. The strap defines a plurality of bores arranged along a length of the strap. Each of the first and second hook assemblies includes an engaging portion and a hook portion extending from the engaging portion. The engaging portion includes first and second sides. The engaging portion defines an opening extending through the first and second sides. The first side includes a mouth defining an aperture to receive a portion of the strap therethrough. The second side includes a boss configured to securely engage one bore of the plurality of bores of the strap. The hook portion is detachably couplable to the engaging portion of the other one of the first and second hook assemblies to interlock the first and second hook assemblies together.

20 Claims, 12 Drawing Sheets

(56) References Cited

U.S. PATENT DOCUMENTS

| | | |
|---|---|---|
| 2008/0276432 A1 | 11/2008 | McNeill |
| 2009/0044387 A1 | 2/2009 | Hayes et al. |
| 2011/0225779 A1 | 9/2011 | Jones |
| 2011/0252604 A1 | 10/2011 | Hansen |
| 2012/0167351 A1 | 7/2012 | Ashliman et al. |
| 2013/0181022 A1 | 7/2013 | Bogoslofski et al. |
| 2014/0259551 A1 | 9/2014 | Egbert |
| 2018/0298983 A1 | 10/2018 | Dershem |

OTHER PUBLICATIONS

Written Opinion of the International Searching Authority issued by the U.S. Commissioner of Patents acting as the International Searching Authority in relation to International Application No. PCT/US1/65261 dated Mar. 16, 2022 (6 pages).

* cited by examiner

TIE DOWN STRAP ASSEMBLY INCLUDING A PLURALITY OF ANCHOR POINTS

BACKGROUND

Technical Field

The disclosure relates to tie down strap assemblies, and, more particularly, to a tie down strap assembly adjustably providing a plurality of anchor points.

Background of Related Art

A tie down strap is a fastener used to hold down an object such as, e.g., cargo or equipment, during transport. Tie down straps are essentially webbing that is outfitted with tie down hardware. This hardware allows the tie down strap to attach to the area surrounding the cargo or equipment, loop over the cargo or equipment, and/or attach to the cargo or equipment. For example, the tie down strap may include a ratchet assembly for providing tensioning to the strap.

SUMMARY

In accordance with the disclosure, a tie down strap assembly includes a strap and first and second hook assemblies. The strap is formed of an elastic material. The strap has opposing ends. The strap defines a plurality of bores arranged along a length of the strap. The first and second hook assemblies are disposed at respective opposing ends of the strap. Each of the first and second hook assembly includes an engaging portion and a hook portion extending from the engaging portion. The engaging portion includes first and second sides. The engaging portion defines an opening extending through the first and second sides. The first side includes a mouth defining an aperture to receive a portion of the strap therethrough. The second side includes a boss configured to securely engage one bore of the plurality of bores of the strap. The hook portion is detachably couplable to the engaging portion of the other one of the first and second hook assemblies to interlock the first and second hook assemblies together.

In an aspect, the aperture of the mouth of the engaging portion may be configured to direct the strap towards the opening of the engaging portion.

In another aspect, the aperture of the mouth of the engaging portion may be configured to provide a planar contact between the strap and the engaging portion.

In yet another aspect, the engaging portion may define a peripheral groove to receive the hook portion of the other one of the first and second hook assemblies.

In still yet another aspect, the peripheral groove of the engaging portion may be configured to detachably receive the hook portion of the other one of the first and second hook assemblies via snap-fit coupling.

In still yet another aspect, the boss of the engaging portion may define a groove to secure a portion of the strap.

In an aspect, each one of the first and second hook assemblies may be monolithically formed.

In another aspect, at least one end of the opposing ends of the strap may define a loop.

In yet another aspect, the aperture of the mouth may be axially aligned with a longitudinal axis defined by the first or second hook assembly.

In still yet another aspect, the mouth and the boss of the engaging portion may be in a superposed relation.

In an aspect, the first and second hook assemblies may be identical.

In accordance with another aspect of the disclosure, a tie down strap assembly includes a strap having opposing ends and first and second hook assemblies detachably coupled to the opposing ends of the strap. Each of the first and second hook assemblies includes an engaging portion and a hook portion. The engaging portion includes first and second sides. The engaging portion defines an opening extending through the first and second sides. The first side includes a mouth defining an aperture to receive a portion of the strap therethrough. The second side includes a coupling configured to detachably engage a portion of the strap. The hook portion extends from the engaging portion. The first and second hook assemblies are configured to be interlocked to each other.

In accordance with yet another aspect of the disclosure, a tie down strap assembly includes a strap and a hook assembly. The strap has first and second ends. At least one of the first and second ends defines a loop. The strap defines a plurality of bores arranged along a length of the strap. The hook assembly is detachably securable to the strap. The hook assembly includes an engaging portion and a hook portion extending from the engaging portion. The engaging portion includes first and second sides. The engaging portion defines an opening extending through the first and second sides. The first side includes a mouth defining an aperture to receive a portion of the strap therethrough. The second side includes a coupling configured to detachably engage a portion of the strap. The hook portion includes a tip configured to be received through one bore of the plurality of bores.

In an aspect, the strap may be formed of a flexible material.

BRIEF DESCRIPTION OF THE DRAWINGS

Various aspects of the disclosure are described hereinbelow with reference to the drawings, which are incorporated and constitute a part of this specification, wherein.

DETAILED DESCRIPTION

The disclosed tie down strap assembly is described in detail with reference to the drawings, in which like reference numerals designate identical or corresponding elements in each of the several views. As used herein, the term "distal," as is conventional, will refer to that portion of the device or component thereof which is farther from the user, while the term "proximal" will refer to that portion of the device or component thereof which is closer to the user. As used herein, the terms parallel and perpendicular are understood to include relative configurations that are substantially parallel and substantially perpendicular up to about + or −10 degrees from true parallel and true perpendicular. In the following description, well-known functions or constructions are not described in detail to avoid obscuring the disclosure in unnecessary detail.

Figure 1:
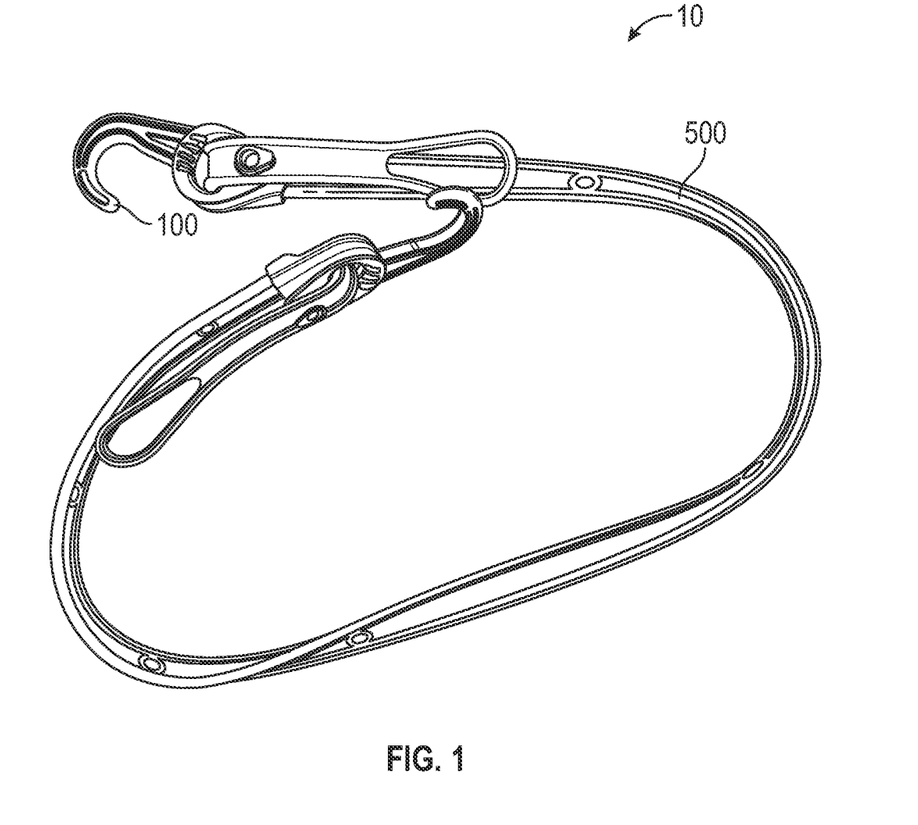
FIG. 1 is a perspective view of a tie down strap assembly in accordance with the disclosure.
Figure 2:
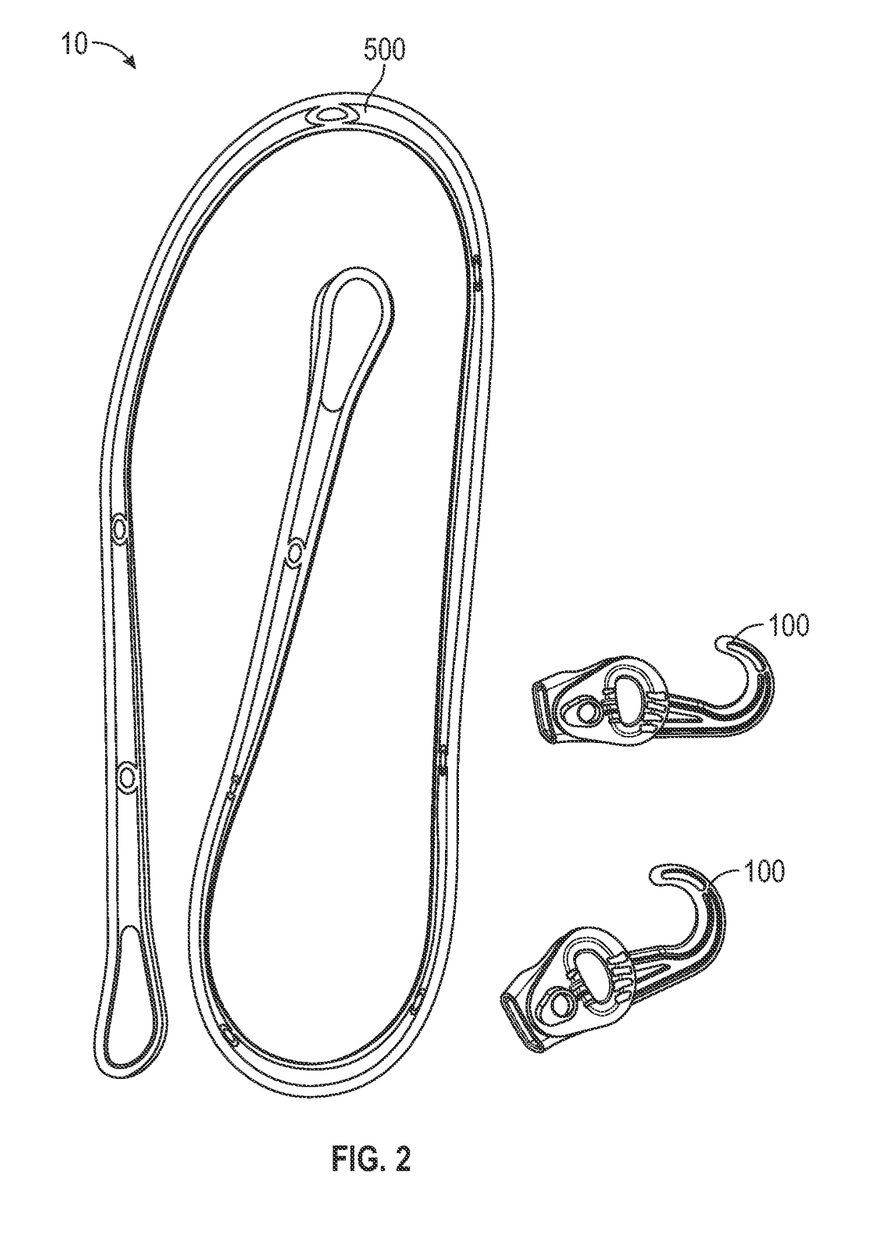
FIG. 2 is an exploded perspective view of the tie down strap assembly of FIG. 1 with parts separated.

With reference to FIGS. 1 and 2, a tie down strap assembly in accordance with the disclosure is generally designated as 10. The tie down strap assembly 10 serves as a fastener to secure an object such as, e.g., cargo or equipment. In particular, the tie down strap assembly 10 is configured to adjustably provide a plurality of anchoring points to accommodate objects of various dimensions. The tie down strap assembly 10 includes hook assemblies 100 and a strap 500 in the form of, e.g., a flexible or elastic band. The hook assemblies 100 are detachably coupled to respective opposing ends of the strap 500. The hook assemblies 100 may be interlocked or nested to form a closed looped tie down strap assembly 10, as will be discussed below. Alternatively, the hook assembly 100 may securely engage a plurality of points on the strap 500 to form an anchoring point or a loop, as will be discussed below. It is envisioned that a plurality of tie down strap assemblies 10 may be utilized to form a longer tie down strap assembly 10. Specifically, the hook assemblies 100 of different tie down strap assemblies 10 may be interlocked to form a connection in tandem.

Figure 3:
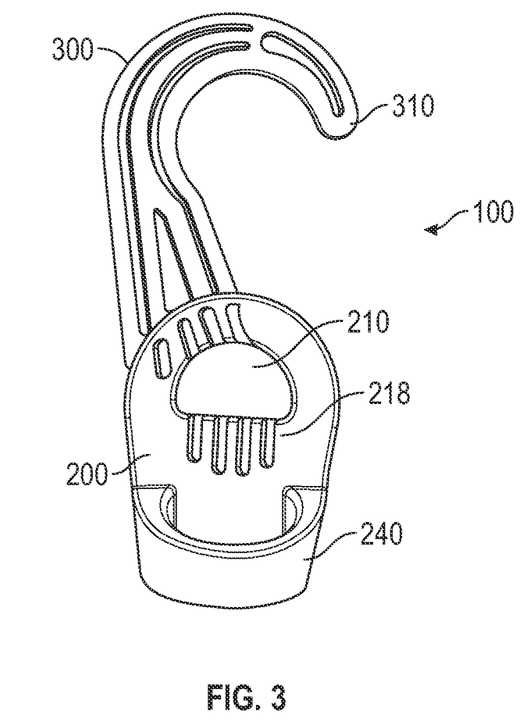
FIG. 3 is a top view of a hook assembly of the tie down strap assembly of FIG. 1.
Figure 4:
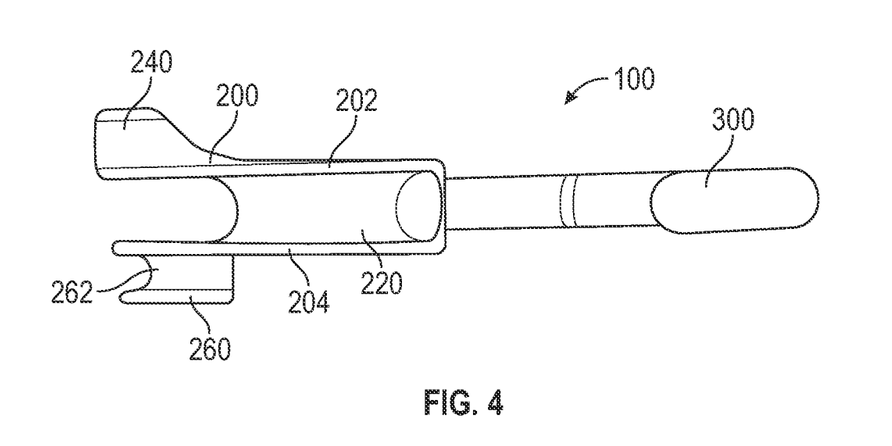
FIG. 4 is a side view of the hook assembly of FIG. 3.
Figure 5:
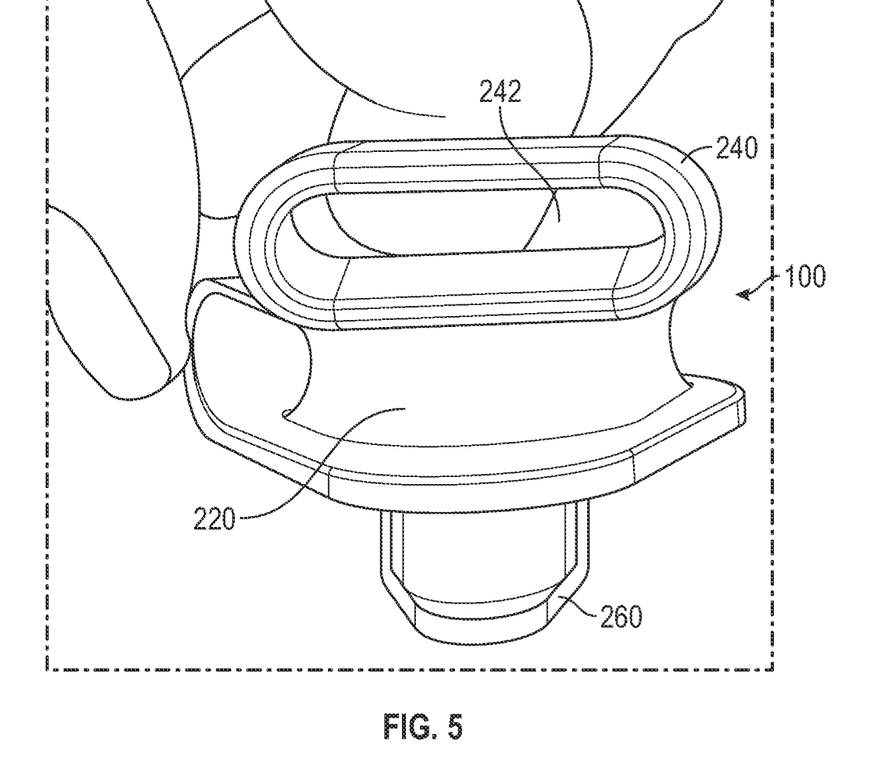
FIG. 5 is a front-end view of the hook assembly of FIG. 3.

With reference to FIGS. 3-5, the hook assembly 100 includes an engaging portion 200 and a hook portion 300 extending from the engaging portion 200. The engaging portion 200 and the hook portion 300 are formed as a single construct. In an aspect, the hook assembly 100 may be monolithically formed. For example, the hook assembly 100 may be formed of a polymer. The engaging portion 200 includes opposing first and second sides 202, 204. The engaging portion 200 defines an opening 210 extending between the first and second sides 202, 204. The opening 210 is dimensioned to receive a portion of the strap 500 therethrough. In particular, the first side 202 includes a mouth 240 defining an aperture 242 dimensioned to receive at least a portion of the strap 500 therethrough. The aperture 242 is aligned with a central longitudinal axis defined by the hook assembly 100. The aperture 242 is configured to direct the portion of the strap 500 towards the opening 210. For example, the aperture 242 is oriented to provide a planar contact between the strap 500 and the first side 202. The second side 204 of the engaging portion 200 includes a boss 260 configured to secure the strap 500 thereto. Specifically, the boss 260 is received in a desired bore 550 (FIG. 12) of the strap 500. In particular, the boss 260 may define a groove 262 to further enhance securement of the strap 500 to the boss 260. The boss 260 and the aperture 242 of the mouth 240 may be in a superposed relation. The engaging portion 200 further includes a connecting wall 218 that is tapered or beveled to direct the strap 500 extending through the aperture 242 of the mouth 240 into the opening 210 such that the strap 500 wraps around the connecting wall 218 towards the boss 260 on the opposing side of the engaging portion 200.

With particular reference to FIGS. 4 and 5, the engaging portion 200 further defines a groove 220 in a peripheral portion of the engaging portion 200. In particular, the groove 220 partially surrounds the opening 210. The groove 220 has a radius of curvature complementary to a radius of curvature of the hook portion 300 such that a hook portion 300 of another hook assembly 100 may be received therein. For example, the groove 220 may detachably receive the hook portion 300 of another hook assembly 100 through, e.g., snap-fit configuration.

Figure 6:
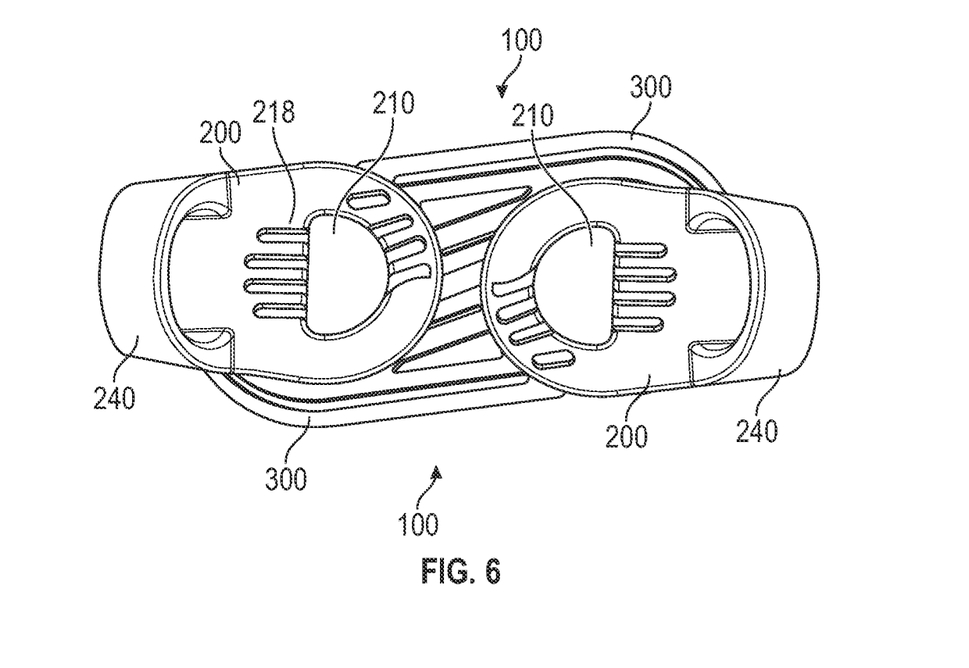
FIG. 6 is a top view of hook assemblies of FIG. 1, illustrating the hook assemblies in an interlocked state.
Figure 7:
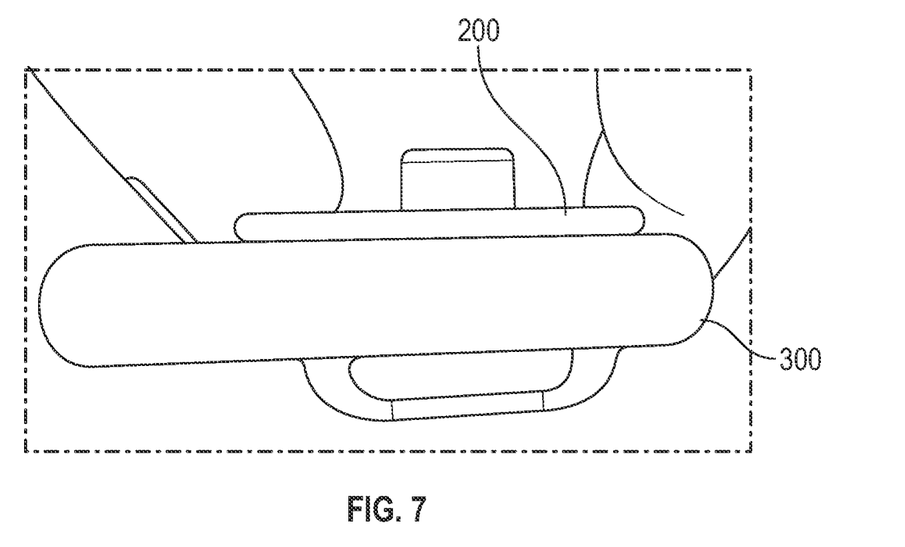
FIG. 7 is a back-end view of the hook assemblies of FIG. 6.
Figure 8:
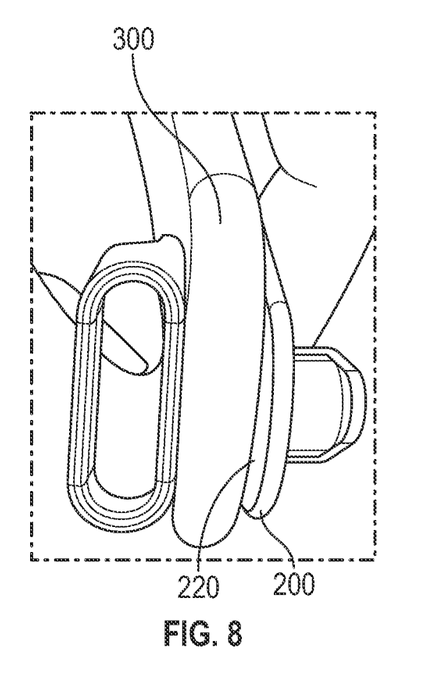
FIG. 8 is a front-end view of the hook assemblies of FIG. 6.
Figure 9:
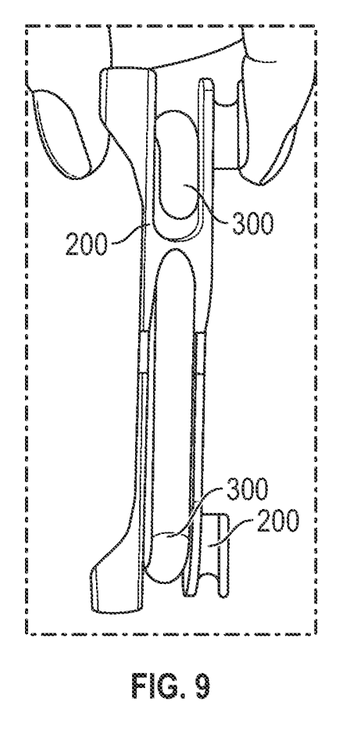
FIG. 9 is a side view of the hook assemblies of FIG. 6.

With reference to FIG. 6, the hook assemblies 100 at respective opposing ends of the strap 500 (not shown) may be interlocked or nested together. As shown in FIGS. 7-9, the hook portion 300 of one of the hook assembly 100 is received in the groove 220 of the engaging portion 200 of the other hook assembly 100 via snap-fit coupling.

Figure 10:
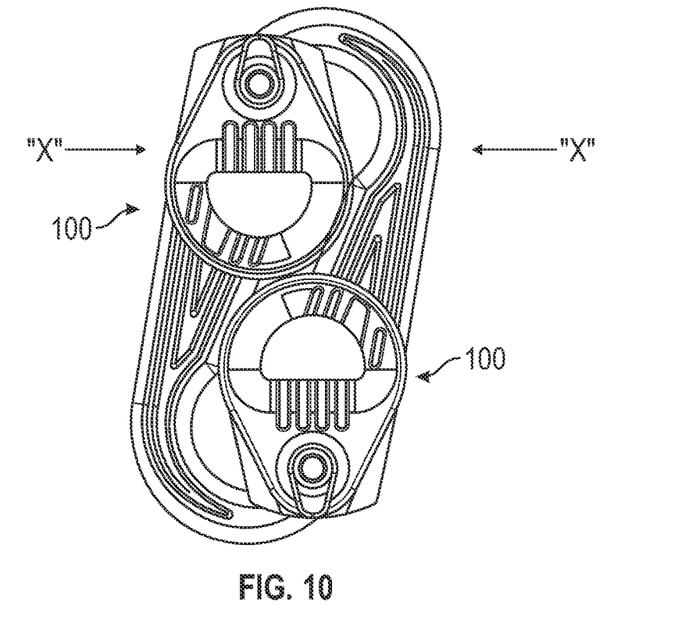
FIGS. 10 and 11 are top views of the hook assemblies of FIG. 6, illustrating interlocking attachment of the hook assemblies.
Figure 11:
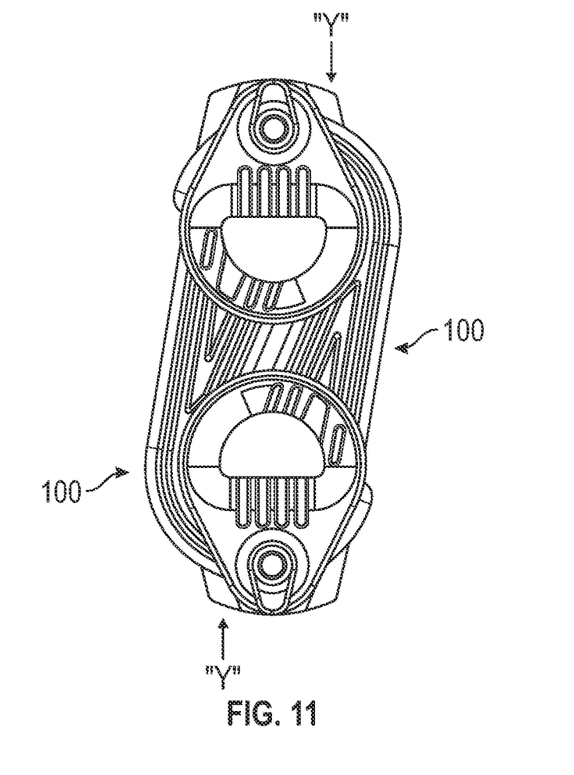

With reference to FIGS. 10 and 11, two hook assemblies 100 may be interlocked by positioning the hook portions 300 in the corresponding grooves 220 and applying forces in the direction of arrows "X" to provide, e.g., a snap-fit, coupling. The interlocked hook assemblies 100 may be detached from each other through applying forces in the direction of arrows "Y".

Figure 12:
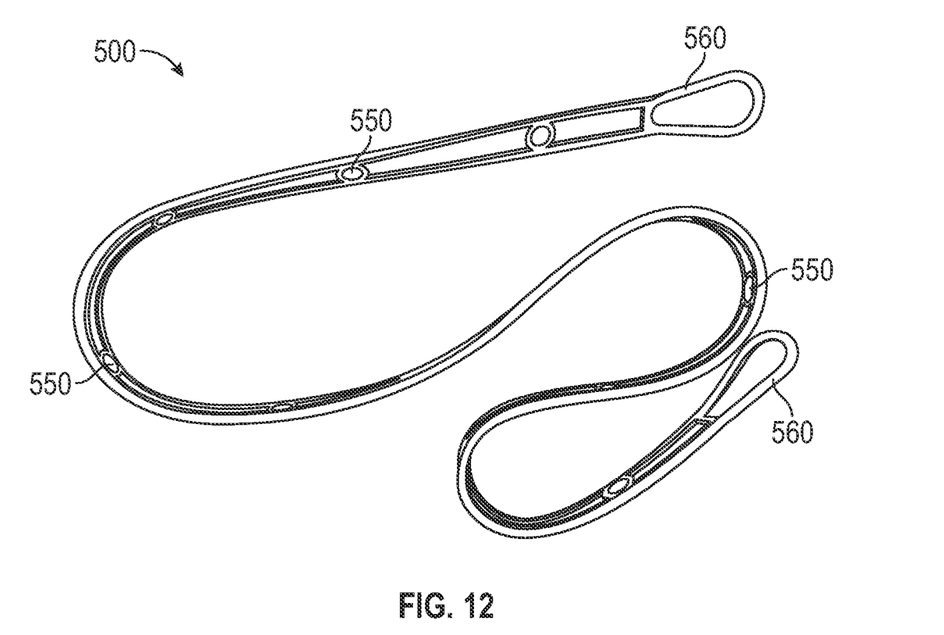
FIG. 12 is a perspective view of a strap of the tie down strap assembly of FIG. 1.
Figure 13:
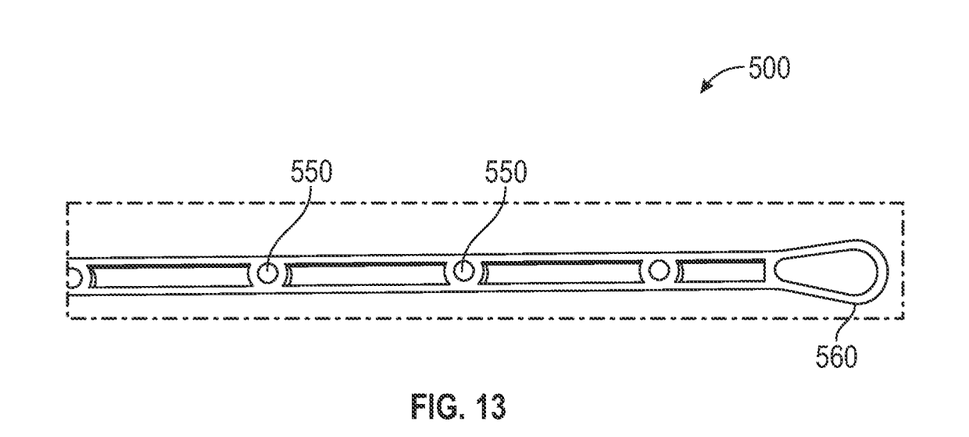
FIG. 13 is a partial top view of the strap of FIG. 11.

With reference now to FIGS. 12 and 13, the strap 500 is a flexible or elastic band that is configured to provide tension to enhance securement. The strap 500 includes opposing ends having respective loops 560. Each loop 560 is dimensioned to be received through the aperture 242 (FIG. 5) of the mouth 240 of the hook assembly 100. The strap 500 defines a plurality of bores 550 arranged along a length of the strap 500. Each bore 550 is dimensioned to receive the boss 260 (FIG. 4) of the hook assembly 100 or a tip 310 (FIG. 3) of the hook portion 300, as will be discussed below. Under such a configuration, an anchor point may be selectively chosen to accommodate various dimensions of the object to be secured or fastened.

Figure 14:
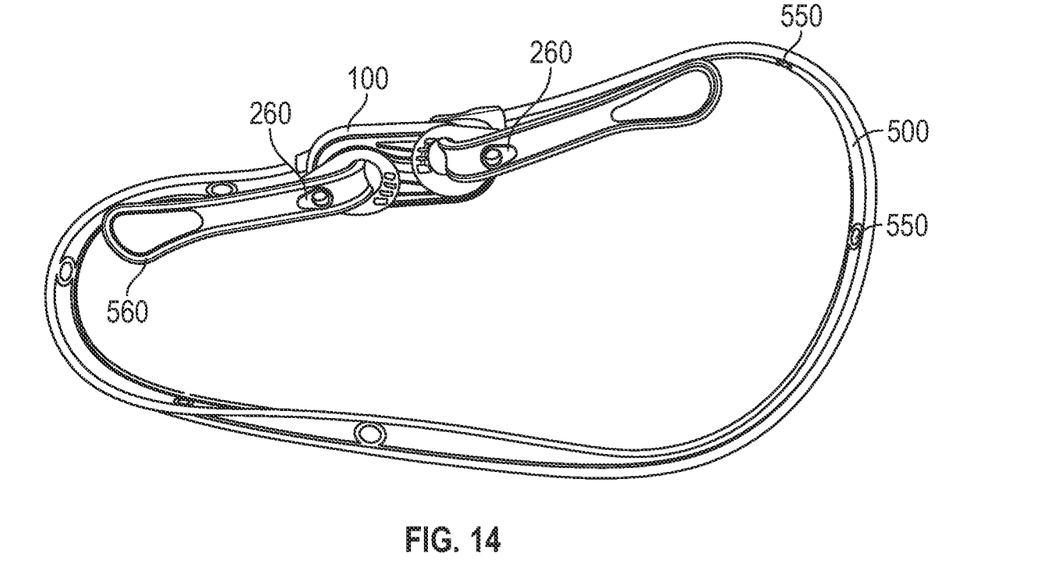
FIG. 14 is a perspective view of the tie down strap assembly of FIG. 1, illustrating the tie down strap assembly in a closed loop configuration.
Figure 15:
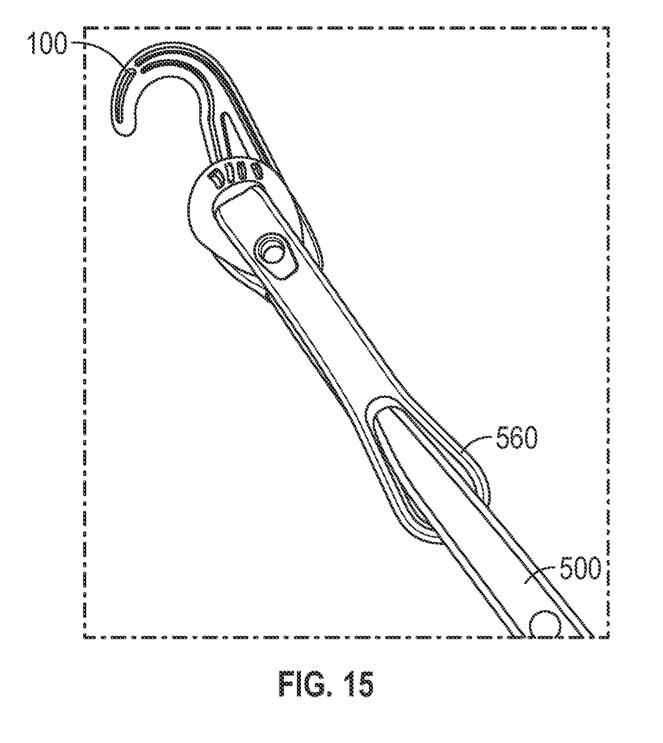
FIG. 15 is a partial top view of the tie down strap assembly of FIG. 1, illustrating another method of securing the strap with the hook assembly.

With reference to FIG. 14, in use, the opposing ends of the strap 500 are interlocked and the length of the strap 500 is adjusted by securing the bosses 260 of the hook assemblies 100 to the desired bores 550 of the strap 500. Specifically, the loop 560 of the strap 500 is received through the aperture 242 (FIG. 5) of the mouth 240 of the corresponding hook assembly 100 and through the opening (FIG. 3). Thereafter, the length of the strap 500 is adjusted through selecting the bore 550 that will provide adequate tension in the strap 500. Alternatively, the strap 500 may also extend through the loop 560, as shown in FIG. 15, to further enhance securement of the strap 500 with the hook assembly 100.

Figure 16:
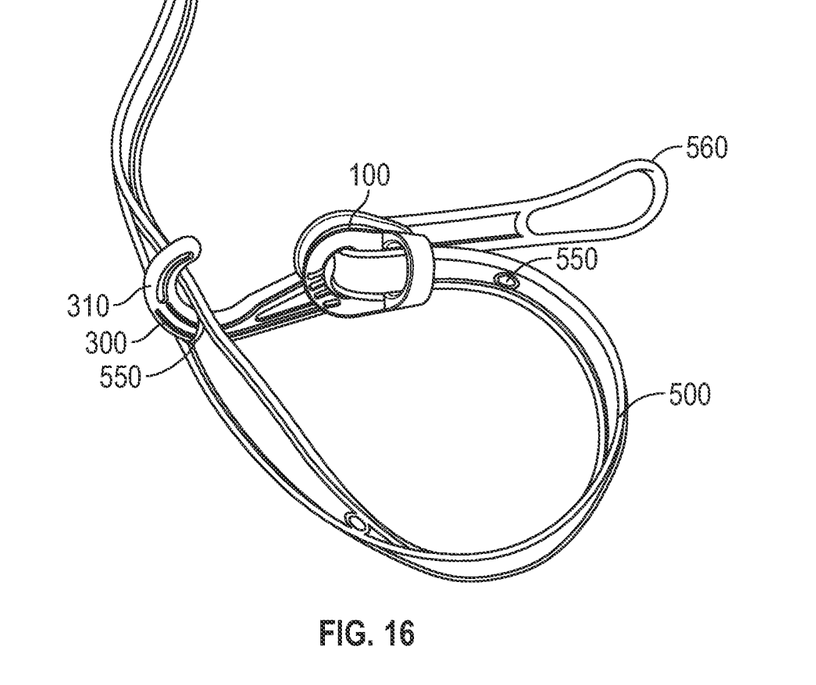
FIG. 16 is a partial perspective view of the tie down strap assembly of FIG. 1, illustrating securing the hook assembly to the strap.
Figure 17:
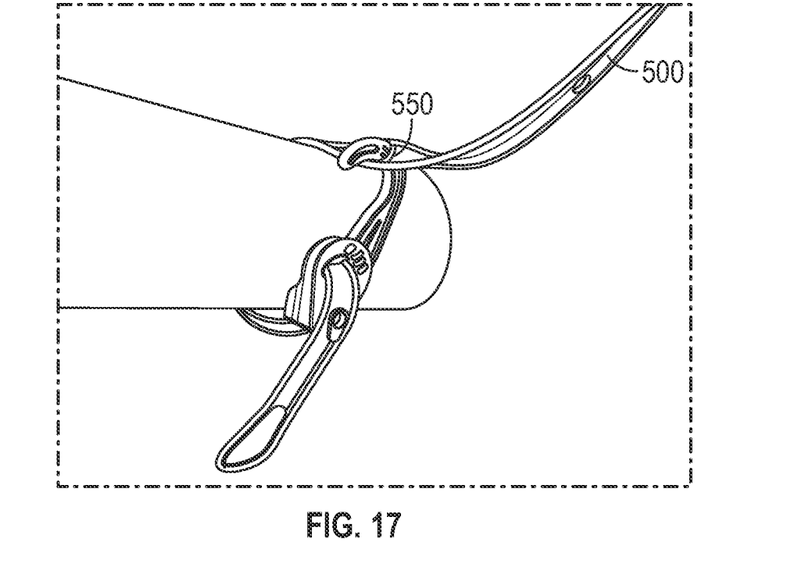
FIG. 17 is a partial perspective view of the tie down strap assembly of FIG. 16, illustrating use thereof.
Figure 18:
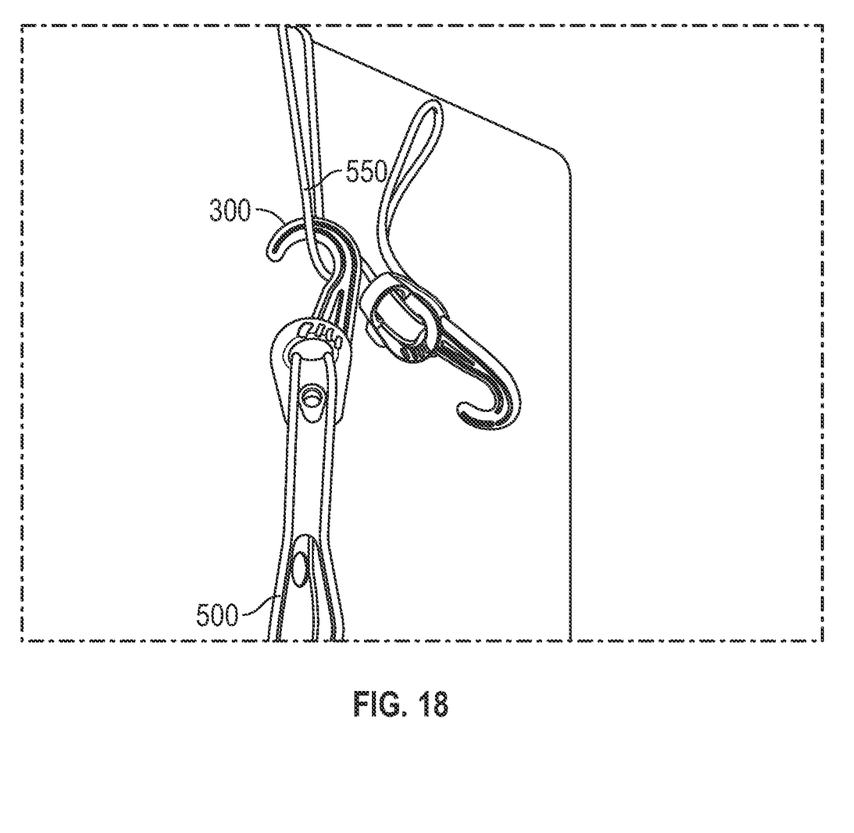
FIG. 18 is a partial perspective view of the tie down strap assembly of FIG. 1, illustrating use thereof.

While it has been shown to form a closed loop by interlocking the hook assemblies 100 to each other, the hook portion 300 may be directly secured to the strap 500. Specifically, as shown in FIGS. 16 and 17, the tip 310 of the hook portion 300 of the hook assembly 100 may be received through a bore 550 of the strap 500 to form a desired closed loop. In this manner, the tie down strap assembly 10 may fasten an object, as shown in FIG. 18.

Figure 19:
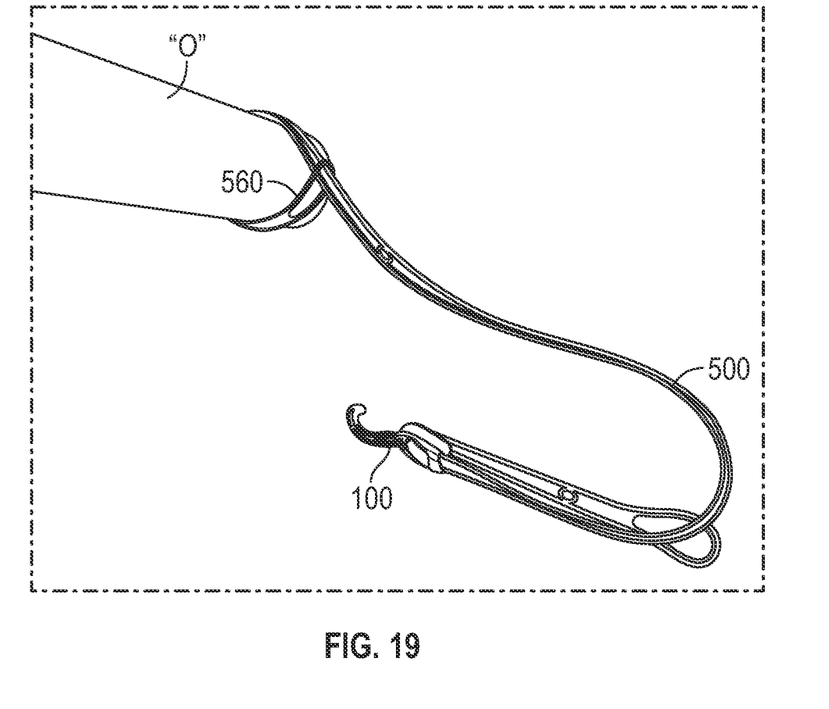
FIGS. 19 and 20 are partial perspective views of the tie down strap assembly of FIG. 1 utilizing a single hook assembly.
Figure 20:
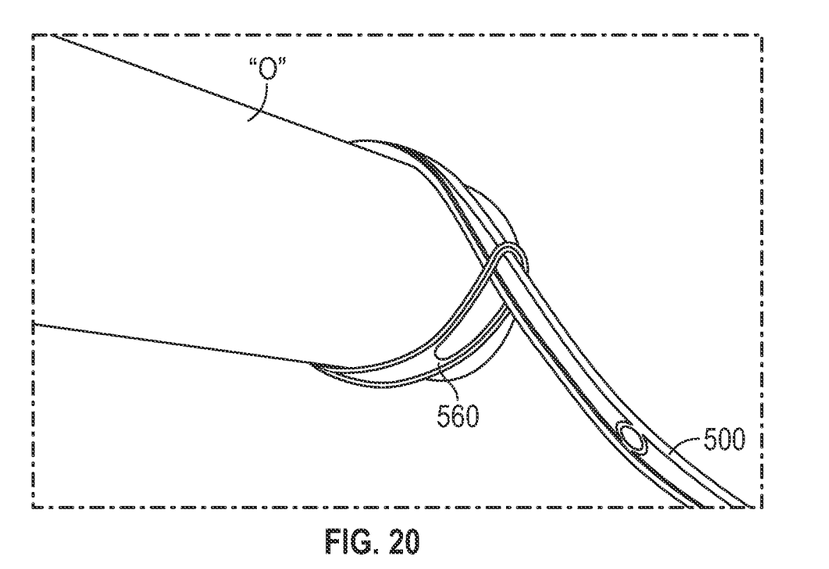
Figure 21:
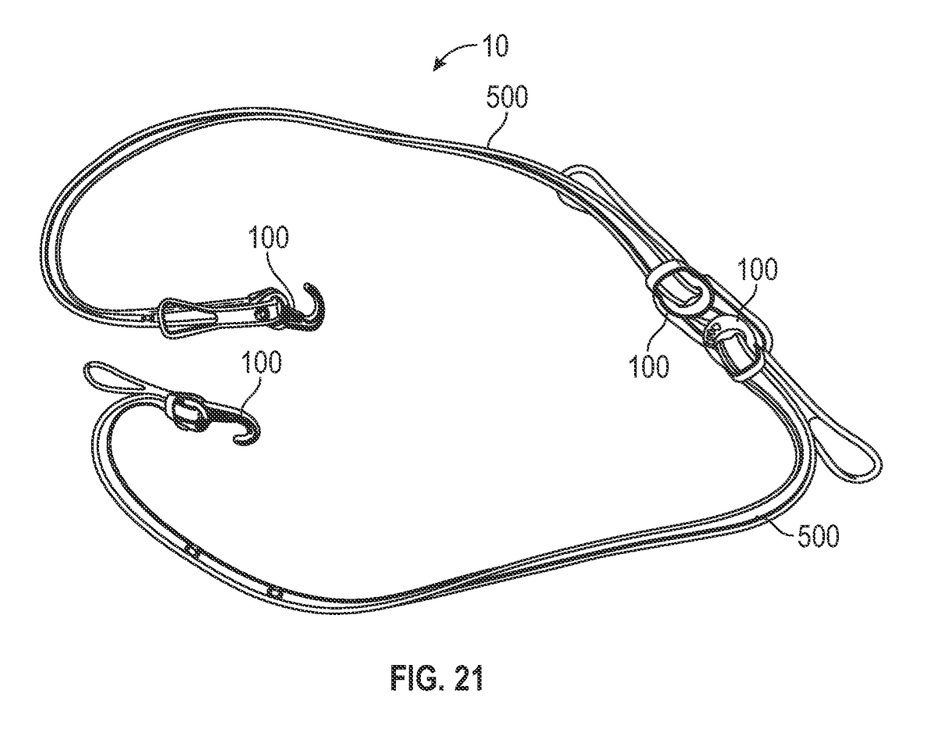
FIG. 21 is a perspective view of two tie down strap assemblies coupled for use in tandem.

In another aspect, the tie down strap assembly 10 may be used with only a single hook assembly 100. With reference to FIGS. 19 and 20, one end of the tie down strap assembly 10 may be used without the hook assembly 100. The one end with the loop 560 may form a loop by looping the strap 500 through the loop 560 around an object "O". With reference to FIG. 21, it is further contemplated that the tie down strap assembly 10 may be lengthened through use of additional tie down strap assembly 100. Specifically, hook assemblies 100 of two tie down strap assemblies 10 may be interlocked in a manner described above to connect the two tie down strap assemblies 10 in tandem.

Any of the components described herein may be fabricated from either metals, plastics, resins, composites, or the like taking into consideration strength, durability, wearability, weight, resistance to corrosion, ease of manufacturing, cost of manufacturing, and the like. It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

It will be understood that various modifications may be made to the disclosed tie down strap assembly. Therefore, the above description should not be construed as limiting, but merely as exemplifications of the disclosure. Those skilled in the art will envision other modifications within the scope and spirit of the disclosure.

The invention claimed is:

1. A tie down strap assembly comprising:
a strap formed of an elastic material, the strap having opposing ends, the strap defining a plurality of bores arranged along a length of the strap; and
first and second hook assemblies disposed at respective opposing ends of the strap, each of the first and second hook assemblies including:
an engaging portion including first and second sides, the engaging portion defining an opening extending through the first and second sides, the first side including a mouth defining an aperture to receive a portion of the strap therethrough, the second side including a boss configured to securely engage one bore of the plurality of bores of the strap; and
a hook portion extending from the engaging portion, the hook portion detachably couplable to the engaging portion of the other one of the first and second hook assemblies to interlock the first and second hook assemblies together.

2. The tie down strap assembly according to claim 1, wherein the aperture of the mouth of the engaging portion is configured to direct the strap towards the opening of the engaging portion.

3. The tie down strap assembly according to claim 2, wherein the aperture of the mouth of the engaging portion is configured to provide a planar contact between the strap and the engaging portion.

4. The tie down strap assembly according to claim 1, wherein the engaging portion defines a peripheral groove to receive the hook portion of the other one of the first and second hook assemblies.

5. The tie down strap assembly according to claim 4, wherein the peripheral groove of the engaging portion is configured to detachably receive the hook portion of the other one of the first and second hook assemblies via snap-fit coupling.

6. The tie down strap assembly according to claim 1, wherein the boss of the engaging portion defines a groove to secure a portion of the strap.

7. The tie down strap assembly according to claim 1, wherein each of the first and second hook assemblies is monolithically formed.

8. The tie down strap assembly according to claim 1, wherein at least one end of the opposing ends of the strap defines a loop.

9. The tie down strap assembly according to claim 1, wherein the aperture of the mouth is axially aligned with a longitudinal axis defined by the first or second hook assembly.

10. The tie down strap assembly according to claim 1, wherein the mouth and the boss of the engaging portion are in a superposed relation.

11. The tie down strap assembly according to claim 1, wherein the first and second hook assemblies are identical.

12. A tie down strap assembly comprising:
a strap having opposing ends; and
first and second hook assemblies detachably coupled to the opposing ends of the strap, each of the first and second hook assemblies including:
an engaging portion including first and second sides, the engaging portion defining an opening extending through the first and second sides, the first side including a mouth defining an aperture to receive a portion of the strap therethrough, the second side including a coupling configured to detachably engage a portion of the strap; and
a hook portion extending from the engaging portion, the first and second hook assemblies are configured to be interlocked to each other.

13. The tie down strap assembly according to claim 12, wherein the aperture of the mouth of the engaging portion is oriented to provide a planar contact between the strap and the engaging portion.

14. The tie down strap assembly according to claim 12, wherein the engaging portion of the first hook assembly defines a peripheral groove to receive the hook portion of the second hook assembly.

15. The tie down strap assembly according to claim 12, wherein the aperture of the mouth of the engaging portion is configured to direct the strap towards the opening of the engaging portion.

16. The tie down strap assembly according to claim 12, wherein at least one end of the opposing ends of the strap defines a loop.

17. The tie down strap assembly according to claim 12, wherein the mouth and the boss of the engaging portion are in a superposed relation.

18. A tie down strap assembly comprising:
- a strap having first and second ends, at least one of the first and second ends defining a loop, the strap defining a plurality of bores arranged along a length of the strap; and
- a hook assembly detachably securable to the strap, the hook assembly including:
  - an engaging portion including first and second sides, the engaging portion defining an opening extending through the first and second sides, the first side including a mouth defining an aperture to receive a portion of the strap therethrough, the second side including a coupling configured to detachably engage a portion of the strap; and
  - a hook portion extending from the engaging portion, the hook portion including a tip configured to be received through one bore of the plurality of bores.

19. The tie down strap assembly according to claim 18, wherein the strap is formed of a flexible material.

20. The tie down strap assembly according to claim 18, wherein the aperture of the mouth of the engaging portion is oriented to provide a planar contact between the strap and the first side of the engaging portion.

* * * * *